July 10, 1934.　　　　I. E. McCABE　　　　1,965,708
VAPOR VACUUM HEATING SYSTEM
Filed Sept. 5, 1933　　　2 Sheets-Sheet 1

INVENTOR
I. E. McCABE
BY Langdon Moore
ATTORNEY

July 10, 1934.                I. E. McCABE                1,965,708
                        VAPOR VACUUM HEATING SYSTEM
                          Filed Sept. 5, 1933              2 Sheets-Sheet 2

INVENTOR
I. E. McCABE.
BY Langdon Moon
ATTORNEY

Patented July 10, 1934

1,965,708

UNITED STATES PATENT OFFICE 1,965,708

VAPOR VACUUM HEATING SYSTEM

Ira E. McCabe, Chicago, Ill.

Application September 5, 1933, Serial No. 688,079

7 Claims. (Cl. 236—20)

This invention relates to improvements in domestic heating systems incorporating indirect hot water supplying means and more particularly to an automatically controlled vapor vacuum heating system for heating dwellings and at the same time providing a source of year around hot water supply for domestic purposes independently of the operation to produce heat for the building.

Automatically controlled steam and hot water heating systems for dwellings have heretofore been provided with means for producing a source of hot water supply for domestic purposes irrespective of the building temperature. The production of domestic hot water during the time the heating system would normally be inoperative is termed "summer hot water supply". Steam and hot water domestic heating systems depending upon the operation of fluid fuel burner, coal stoker or other automatic sources of heat have been provided with means for circulating the hot water from the heating system boiler to heat the water in the tank providing a source of hot water supply at all times independently of the operation of the heating system. Such means is disclosed in the Breese Patent No. 1,533,630, dated April 14, 1925, and the Abbott Patent No. 1,654,396, dated December 27, 1927, and also illustrated in the catalogue of Taco Heaters, Inc. of New York City, published in 1930.

At present, vacuum vapor heating systems employing automatic heating equipment and indirect systems of hot water heating require that the hot water control, which operates independently of the room thermostat to maintain boiler water temperatures for heating the hot water supply as disclosed in the aforementioned patents, be set to maintain water temperatures below that required to produce vapors for heating purposes. During the heating season the hot water control will only function at infrequent intervals as the normal demands made by the room thermostat will keep the water at higher temperatures which insures adequate heating of the domestic hot water supply. However, during those periods of the year when little or no demand for heat is required and the hot water control functions to maintain boiler water temperatures for heating the hot water supply, it has been found, that where large amounts of hot water are used the setting of the boiler control, which must be below those temperatures which produce vapors, is too low and difficulty is had in maintaining desirable hot water temperature when the drain on the storage tank is heavy.

It is an object of this invention to provide automatic means in a vacuum vapor heating system, whereby such a heating system may be employed both as a source of house and hot water supply heating and by automatically breaking the vacuum in the system whenever the heat from the boiler is desired only for heating the domestic hot water supply to provide heat therefor without heating the house and upon a call for heat to restore the vacuum. Thus by breaking the vacuum, it is possible to have the hot water control maintain higher boiler water temperatures and thus boiler water of sufficient temperatures is available to heat the large volumes of water desired for domestic hot water use the year around.

With these and other objects in view reference is made to the accompanying sheets of drawings which illustrate preferred embodiments of this invention with the understanding that minor detail changes may be made without departing from the scope thereof.

Figure 1:
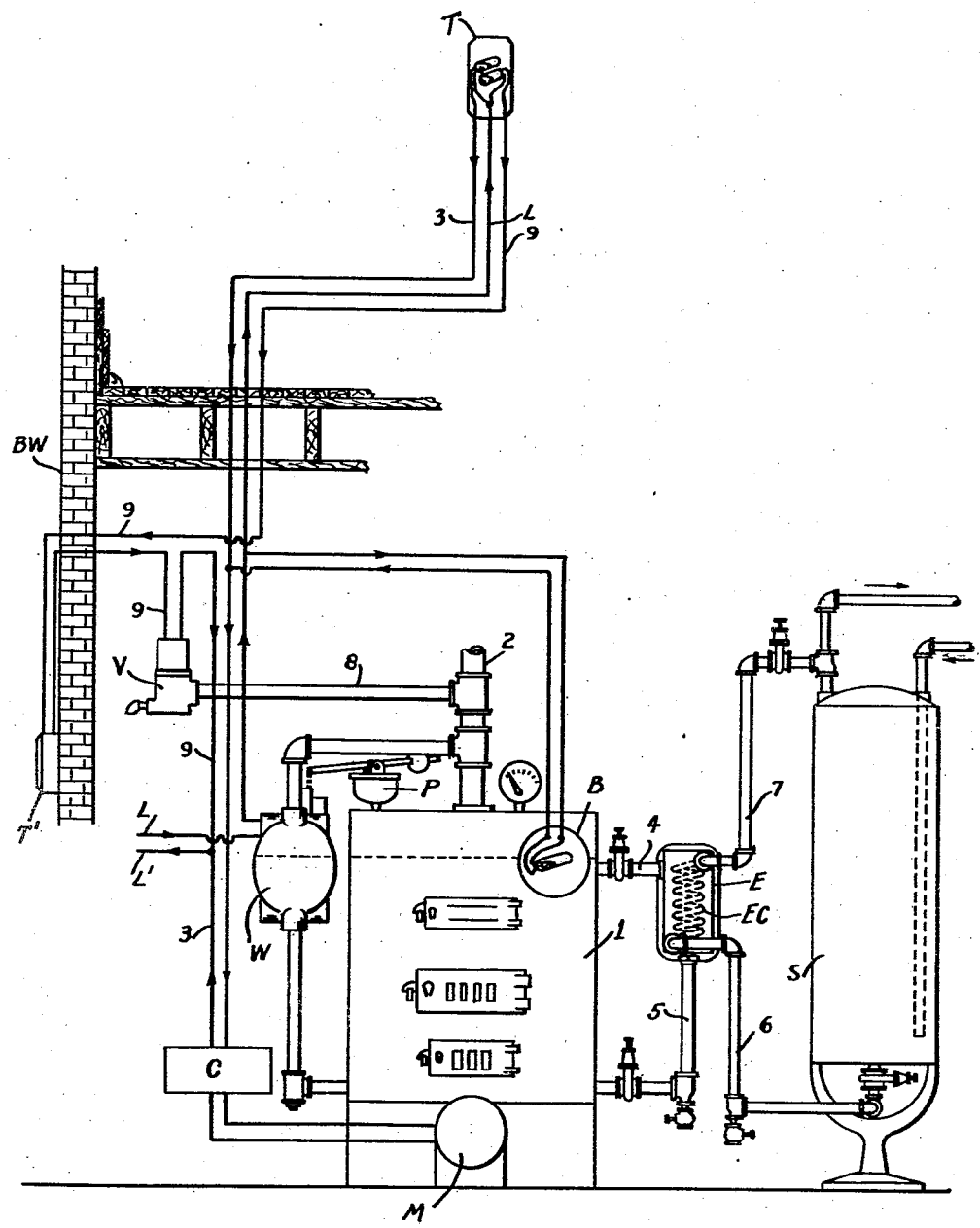
Figure 1 is a diagrammatical view of a form of this invention, showing the walls and floor of a dwelling in vertical section with a vapor vacuum heater and a domestic hot water tank in front elevation.

In the embodiment of this invention illustrated in Figure 1, the boiler or heater 1 is connected by the pipe 2 to convey the steam or vapor from the boiler to the radiators of a vacuum vapor heating system. Inasmuch as this invention relates to the utilization of the hot water in the boiler 1 to supply a source of domestic hot water supply, and vacuum vapor heating systems are well known, the remainder of the heating system is not illustrated. The source of heat for raising the temperature of the water in the boiler 1 may be any form of electrically operated and controlled fluid fuel burner or stoker M controlled by room thermostat T in the usual manner. In vacuum vapor heating systems it is customary to provide a low water cutoff W and a pressure regulator P in the circuit to the burner or stoker. In this instance, the current from the commercial line L passes through a low water cutout W of commercial design, such as illustrated in the catalogue of The Mercoid Corporation, No. H6 dated June, 1930, and from thence through the thermostate T by wire 3 to the heat producing mechanism M and from thence to the return lead L' to the commercial line. If desired, any commercial safety control C may be interposed in the circuit between the thermostat and return line. The pressure control illustrated comprises an adjustable sylphon which is attached to an operating arm of the low water control which will operate said control to break the circuit therethrough when the pressure within the boiler rises above a predetermined degree. The low water control is adapted to permit the burner to operate when the water in the boiler is maintained at safe levels and acts independently of the pressure control to break the burner circuit when the water falls below the desired low level. The hot water in the boiler 1 is caused to circulate by means of pipes 4 and 5 through a heat exchanger E and the water in the commercial domestic hot water supply S is caused to circulate through the coils EC of the exchanger by means of pipes 6 and 7 whereby the maintaining of the temperature of the water in the boiler 1 below the boiling points will provide a source of domestic hot water supply.

In order to maintain the temperature of the water within the boiler at a sufficient degree independently of the operation of the supply of steam or vapor to the heating system, a temperature actuated boiler control, of commercial form such as illustrated in said Mercoid catalogue, is connected in parallel with the commercial line between the room thermostat T and burner or stoker mechanism M which control is actuated to close the circuit whenever the temperature of the water falls below the predetermined degree.

In order to prevent steam or vapor entering the radiators of the system whenever the temperature of the building has reached a predetermined degree an automatic vacuum breaker is provided which comprises a pipe 8 leading from the pipe 2 and provided with a solenoid operated valve V which when open will exhaust into the atmosphere. To control the operation of this valve which is of commercial construction and illustrated in said Mercoid catalogue to normally remain closed an additional thermostat T' is located on the exterior of the building wall BW. The room thermostat T is of the two-circuit type adapted upon a decrease in temperature below that desired maintained in the dwelling to close one circuit, heretofore described to the burner or stoker motor M and break the other and when this temperature has been reached to break the burner circuit and close the other contact to establish a circuit from the lead L of the commercial line through the wire 9 through the exterior thermostat T' and solenoid valve V to the return lead L' of the commercial line whereby the valve V is opened to break the vacuum in the system by opening pipe 2 to the atmosphere. It is to be understood that the exterior thermostat T' is adjustable and would be set so that it would usually remain open at temperatures somewhat below that at which the room thermostat T is set the difference, of course, depending upon the particular installation.

By the above described devices the temperature of the water in the boiler may always be maintained at a degree sufficient to provide hot water for domestic purposes and whenever the temperature outside the building reaches or exceeds that desired within the building the burner or stoker motor will be operated independently of the room thermostat T by the boiler control B and the vacuum in the heating system broken by the cooperation of the thermostats T and T' with the solenoid operated valve V. By this arrangement it is possible during the winter months, when the weather is cold, to prevent operation of the vacuum breaker at any time from the external temperature and at the same time, in mild periods of weather to allow the operation of the heating system when the room thermostat calls for heat at various times for short periods.

While the hot water boiler control B may operate to close the motor circuit during an "off" period of the room heating thermostat in the winter season when the vacuum is maintained, no appreciable increase in room temperatures will be felt as the periods of motor operation will not be long and the heat thus produced will hardly be sufficient for general heating. As a matter of fact, such heating as might be produced would tend to maintain the desired temperature called for by the room thermostat and further would prepare the heating plant to respond more rapidly to supply further demands for heat when called upon. The temperature of the boiler water as maintained by the demands of the room heating thermostat T in the winter is ordinarily sufficient to maintain the hot water supply at hot water temperatures.

Figure 2:
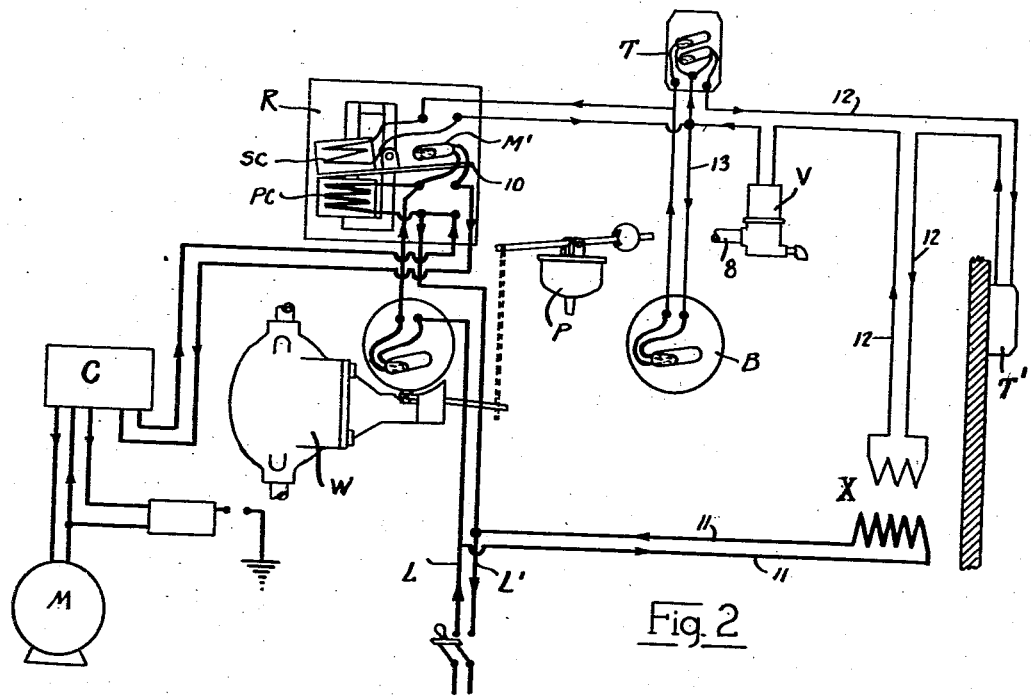
Figure 2 is a schematic wiring diagram of another form.

In the form shown in Figure 2 the operating parts are the same, the only difference being that the thermostats T and T', the boiler control B and the solenoid valve V are arranged in a low voltage circuit. In Figure 1 these operating parts were actuated and operated by the commercial line, while in Figure 2 the switch M' in the commercial line in the circuit to the burner or other stoker mechanism M is opened and closed by a repulsion relay R such as disclosed in this applicant's co-pending application, Serial No. 500,747, filed December 8, 1930. In this type of relay the closing of the secondary circuit by the room thermostat T energizes the secondary coil SC causing it to be repelled or float above the fixed primary coil PC and in so doing tilts the pivoted arm 10 to close the commercial line switch M'. The boiler control B is connected in parallel with the secondary circuit between the room thermostat T and the secondary coil SC. An additional transformer X with its primary connected by wires 11 across the commercial line circuit is provided for the external thermostat T. The secondary of the transformer X is connected by wires 12, so that when the room thermostat T opens the switch to the fuel supply mechanism M it closes the switch in the secondary circuit of the transformer X through the exterior thermostat T' and, if this thermostat is closed, through the solenoid valve V to open the valve to the atmosphere and break the vacuum through pipe 8. The boiler control B being closed and connected in series with the coil SC will energize said coil to close the switch M'.

Normally when the room thermostat calls for heat and the external temperature is below that for which the thermostat T' is set, the solenoid valve V in the vacuum breaker remains closed, the vacuum seal is maintained and the system acts as a heating plant for the dwelling. Whenever the room temperature is satisfied, the circuit is closed in the opposite direction and permits the vacuum to be broken whenever the external temperature closes the external thermostat T', and a continuous supply of hot water for domestic purposes is provided the year around.

Figure 3:
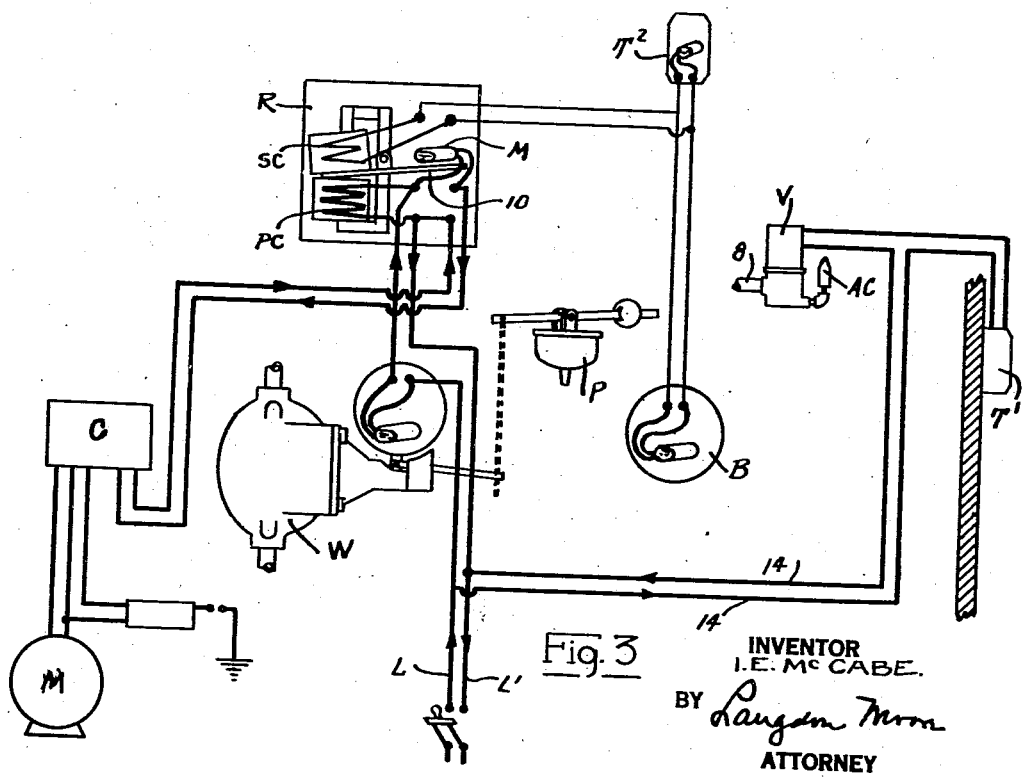
Figure 3 is a view similar to Figure 2 of another modification.

In Figure 3, the room thermostat T2 is single acting and is connected in the secondary circuit with the coil SC of the repulsion relay R and the boiler control B is connected in parallel therewith between the thermostat and coil. The external thermostat T' and solenoid valve V are connected by wire 14 in across the commercial line L—L', so that the operation of the valve V depends entirely upon the closing of the external thermostat T". In this case, the exhaust of the solenoid valve V in the pipe 8 is provided with a thermostatic air valve AC, of commercial construction, so that should the external thermostat T" open the valve V and the room thermostat T2 call for heat at the same time, the steam passing through the valve AV will close it and the vacuum again be established and maintained as long as heat is desired in the dwelling.

What I claim is:

1. In a vacuum vapor heating system, the combination of a domestic hot water supply tank and a heat exchanger communicating with the boiler of the system, with an electrically operated and controlled source of heat including a room thermostat for maintaining a constant temperature within the dwelling, a boiler control adapted to control the source of heat to maintain a predetermined temperature in the heat exchanger, and means, when the external temperature of the building exceeds the predetermined interior temperature, to break the vacuum in the heating system and allow the source of heat to maintain the temperature in the heat exchanger to supply domestic hot water.

2. The structure of claim 1 wherein the last named means includes an external thermostat.

3. The structure of claim 1 wherein the last named means includes a normally closed electrically operated vacuum breaking valve and an external thermostat in circuit therewith.

4. The structure of claim 1 wherein the last named means includes a normally closed electrically operated vacuum breaking valve, an external thermostat, and means when the external thermostat is closed and the room temperature satisfied to establish a circuit to open the vacuum breaker.

5. In a vacuum vapor heating system, the combination of a domestic hot water supply tank and a heat exchanger communicating with the boiler of the system with an electrically operated and controlled source of heat, a two-way thermostat, an external thermostat, an electrically operated vacuum breaking valve, a boiler control, means when the room thermostat calls for heat to establish therethrough a circuit to operate the source of heat, independent means, when the call for heat has been satisfied, to establish a circuit through the external thermostat, when closed, and valve to break the vacuum, and means to establish a circuit through the boiler control to independently operate the source of heat to supply hot water to the exchanger.

6. In a vacuum vapor heating system, the combination of a domestic hot water supply tank and a heat exchanger communicating with the boiler of the system with an electrically operated and controlled source of heat, a repulsion relay for controlling th source of heat, a two-way thermostat, an external thermostat, a transformer for the external thermostat, an electrically operated vacuum breaking valve, a boiler control, means when the room thermostat calls for heat to establish therethrough a circuit to actuate the relay to operate the source of heat, independent means when the call for heat has been satisfied to establish a secondary circuit through the external thermostat when closed and valve to break the vacuum, and means to establish a circuit through the boiler control to actuate the relay independently to operate the source of heat to supply hot water to the exchanger.

7. In a vacuum vapor heating system, the combination of a domestic hot water supply tank and a heat exchanger communicating with the boiler of the system with an electrically operated and controlled source of heat, a repulsion relay for controlling the circuit to the source of heat, a room thermostat in the secondary circuit, an electrically operated vacuum breaking valve, a thermostatic air valve on the discharge side thereof, a boiler control, means, when the room thermostat calls for heat, to establish a circuit through the relay to operate the source of heat, means, when the room thermostat is satisfied and the external temperature has closed the external thermostat, to establish a circuit through said external thermostat to open the vacuum breaking valve, means to establish a circuit through the boiler control and relay to operate the source of heat to supply hot water to the exchanger, and means upon the continued closing of the circuit through the room thermostat furnishing steam or vapor to the system to close the vacuum valve by the passage of the heated vapor therethrough.

IRA E. McCABE.